3,282,864
DI(SULFONYLAZIDES) AS CROSSLINKING AGENTS FOR HYDROCARBON POLYMERS
Howard W. Bost and John E. Mahan, Bartlesville, Okla., assignors to Phillips Petroleum Company, a corporation of Delaware
No Drawing. Filed May 31, 1963, Ser. No. 284,367
8 Claims. (Cl. 260—2.5)

A wide variety of methods and curing agents have been employed for vulcanizing or crosslinking hydrocarbon polymers. Most of the widely used vulcanization procedures and agents require that the polymer contain unsaturation for at least a portion of the reaction with the vulcanizing agent. Recently a large number of saturated hydrocarbon polymers have been developed which are in commercial use. In many instances, vulcanization or crosslinking of these polymers would provide properties which would be quite desirable in many applications. However, these polymers, because of their saturated nature, are very difficult to crosslink with conventional vulcanization agents and various costly and time-consuming operations have been studied in an attempt to build crosslinking capabilities into these polymers. For example, rubbery ethylene-propylene copolymers are being widely studied at this time because of their excellent abrasion resistance. However, since these polymers are saturated and, therefore, difficult to vulcanize, emphasis has been placed on ethylene-propylenediene terpolymers, wherein a fairly small percentage of a non-conjugated diene, or other unsaturated termonomer is copolymerized with the ethylene and propylene to provide unsaturation in the polymer and thus provide sulfur vulcanizing capability.

It is an object of the invention to provide an agent for crosslinking hydrocarbon polymers.

It is a further object of the invention to provide vulcanizates from saturated or unsaturated hydrocarbon polymers.

Yet another object of the invention is to provide a method for vulcanizing saturated or unsaturated hydrocarbon polymers.

Still another object of the invention is to provide a foamed or cellular rubbery polymer.

Still another object is to provide a method of preparing foamed hydrocarbon polymers.

These and other objects of the invention will be readily apparent to those skilled in the art from the following disclosure and appended claims.

These objects are broadly accomplished by a crosslinking or vulcanization agent comprising a cycloalkane di(sulfonylazide) or mixtures thereof.

Preferred agents are those represented by the formula

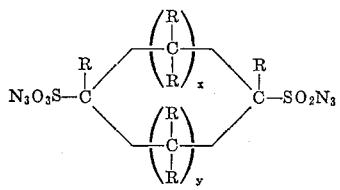

wherein $x$ is a positive integer ranging from 2 to 9, inclusive; $y$ is a positive integer ranging from 0 to 9, inclusive; the sum of $x$ and $y$ ranges from 3 to 10, inclusive; wherein each R is selected from the group consisting of hydrogen and 1 to 3 carbon alkyl radicals and wherein the total number of carbon atoms in the molecule preferably does not exceed 20.

In another embodiment of the invention, a foamed or cellular rubbery polymer is produced by the above agents of the invention by heating a mixture of the agent and the polymer to a temperature above the decomposition point of the agent.

Some examples of compounds of the above general formula which can be employed as crosslinking agents according to the process of this invention are
cyclopentane-1,3-di(sulfonylazide),
cyclohexane-1,4-di(sulfonylazide),
5-methylcyclopentane-1,3-di(sulfonylazide),
4-ethylcyclohexane-1,2-di(sulfonylazide),
1-methylcyclohexane-1,3-di(sulfonylazide),
4-ethylcyclohexane-1,4-di(sulfonylazide),
6-n-propylcycloheptane-1,4-di(sulfonylazide),
2,4,6-tri-n-propylcyclooctane-1,3-di(sulfonylazide),
2,2-diisopropylcyclonanane-1,5-di(sulfonylazide),
cyclodecane-1,6-di(sulfonylazide),
5,5,7-trimethylcycloundecane-1,4-di(sulfonylazide),
cyclododecane-1,7-di(sulfonylazide),
1,3,5-trimethylcyclododecane-1,4-di(sulfonylazide),
4-n-propylcyclooctane-1,2-di(sulfonylazide),
cyclohexane-1,3-di(sulfonylazide),
and the like. It is to be understood that these sulfonylazides can be of the cis- or trans-form.

It has been found that the above agents are suitable for vulcanizing, curing or crosslinking hydrocarbon polymers which may be either saturated or which contain some unsaturation. Preferred polymers are the polymers of olefins, particularly mono-olefins and diolefins and copolymers of 2 or more of these monomers having from 2 to 10 carbon atoms per molecule. These materials may be halogenated or otherwise substituted. Typical saturated polymers which can be crosslinked by means of the agents of this invention are polyethylene, including the so-called high pressure conventional types and the polymers prepared by a chromium oxide catalyzed polymerization, as well as those produced with organo-metallic systems; copolymers of ethylene with other 1-olefins, such as ethylene-butene-1 copolymer, ethylene-propylene copolymers, polypropylene, polyisobutylene, polystyrene, and the like. Polymers containing unsaturation which can be crosslinked with these agents include, for example, polybutadiene, polyisoprene, butadiene-styrene copolymers, poly(vinylchloride), poly(vinylidene chloride), chlorinated polyethylene, and the like. A major advantage of the invention is that the agent is suitable for the crosslinking of saturated hydrocarbon polymers which cannot be and which are difficultly crosslinked or vulcanized by means of conventional vulcanization agents such as sulfur and the like. Particularly suitable are the saturated polymers such as ethylene-butene-copolymers and rubbery ethylene-propylene copolymers including the ethylene-propylene terpolymers wherein a third material, such as a non-conjugated diene including cyclopentadiene, is polymerized with the ethylene and propylene to provide unsaturation in the polymer.

The amount of the crosslinking agent employed depends upon the degree of crosslinking desired. Preferably, the amount of the cycloalkane di(sulfonylazide) is in the range from about 0.25 to about 15 weight percent of the polymer, preferably from about 0.5 to about 2.0 weight percent of the polymer.

The crosslinking or vulcanization of the hydrocarbon polymers is carried out by intimately mixing at least one of the cycloalkane di(sulfonylazides) with the hydrocarbon polymer to be crosslinked and thereafter heating the mixture to a temperature above the decomposition temperature of the particular cycloalkane di(sulfonylazide) being employed. Suitable methods for forming the mixture include mixing of the powdered polymer with the powdered sulfonylazide and milling the crosslinking agent into the polymer or mixing a solution of the agent with the polymer and thereafter evaporating the solvent. These agents may be dissolved in any suitable solvent which is not detrimental to the polymer such as benzene, ether, carbon tetrachloride, cyclohexane, and the like.

The temperature at which the polymer is to be cured is dependent upon the decomposition temperature of the particular cycloalkane di(sulfonylazide) employed, as well as the polymer. As dicussed above, the temperature must be above the decomposition temperature of the cycloalkane di(sulfonylazide) employed. Preferably, the temperature is in the range of about 100 to 250° C., more preferably 110 to 200° C.

A particularly preferred crosslinking agent of the invention is cyclohexane-1,4-di(sulfonylazide), principally because of its high (172° C.) decomposition temperature. This agent is particularly adapted for crosslinking polyethylene, preferably the highly crystalline polyethylene prepared by the chromium oxide catalyst polymerization method described in the patent to Hogan et al., U.S. Patent No. 2,825,721.

In addition to the crosslinking effect of these cycloalkane di(sulfonylazides), a gas is evolved from these agents during decomposition which also may be used to produce a blowing effect. This gas consists essentially of nitrogen. If this effect is desired, it is necessary to employ a cycloalkane di(sulfonylazide) of relatively high decomposition temperature so that the polymer can be heated to a fluid state prior to blowing. On the other hand, blowing can be minimized by the use of agents of lower decomposition temperature. Furthermore, if one wishes to emphasize the blowing of the polymers, that is, obtain a porous or cellular or foamed material, he can employ other blowing agents, particularly the monosulfonylazides, in admixture with the cycloalkanes di(sulfonylazides) to obtain further blowing without additional crosslinking. Other conventional blowing agents may also be employed.

The crosslinking agents of the invention can be prepared by a number of methods, such as by sulfochlorinating or sulfobrominating saturated alicyclic hydrocarbons, such as cyclohexane, to form the disulfonyl chlorides. These disulfonyl chlorides can then be reacted with alkali metal azides such as sodium azide, to form the cycloalkane di(sulfonylazides).

In addition to the crosslinking agent, other ingredients can also be incorporated in the polymer. The additives commonly used in rubber vulcanizates can be used here also as, for example, extenders, fillers, pigments, stabilizers, plasticizers, antioxidants, and the like. Exemplary of the fillers that can be added are calcium carbonate, iron oxide, carbon blacks, silica, calcium silicate, alumina, etc. The presence of a filler, and in particular carbon black, has been beneficial in some cases. Obviously, there are many situations in which a filler is not required or desired and excellent results are achieved when only the crosslinking agent is added.

The vulcanizates prepared by the method of the invention are useful in a wide variety of applications, such as cable coatings, tires, molded items, and the like. Foamed crosslinked polyethylene or polypropylene is especially suitable for cable coatings, as it provides both electrical insulation and thermal insulation.

The following specific examples are intended to illustrate the advantages of the process of the invention.

*Example I*

A run was carried out in which cyclohexane-1,4-di(sulfonylazide) was prepared by the reaction of cyclohexane-1,4-di(sulfonyl chloride) with sodium azide.

In this run, cyclohexane-1,4-di(sulfonylazide) was prepared by the reaction of cyclohexane-1,4-di(sulfonyl chloride) with sodium azide. In this run, 126.5 grams of cyclohexane-1,4-di(sulfonyl chloride), prepared by the sulfochlorination of cyclohexane, was dissolved in 2500 ml. of denatured ethyl alcohol. On heating the solution to reflux, some of the chloride dissolved, and the still insoluble portion was filtered off after moderate cooling of the solution. To the solution which remained was added a portion of an aqueous solution prepared by dissolving 121 grams of sodium azide in 450 ml. water. After refluxing the resulting mixture for 3 to 4 hours, about one-third of the remaining chloride was added along with additional aqueous azide solution. This procedure was repeated until all of the chloride and azide had been added. After standing overnight, the mixture, now containing a considerable amount of precipitate, was refluxed for an additional 8 hours. The mixture was then filtered, and the solvent was partially stripped on a rotating film evaporator. Precipitate continued to form during stripping. The precipitate was air dried overnight, yielding 103 grams of crystals, representing a yield of 77.5 percent. This material had a melting point of 175–176° C. on a Fischer melting block and 170–172° C. in an oil bath. The melting point of the starting cyclohexane-1,4-di(sulfonyl chloride) was 181–183° C.

An elemental anlysis of the azide gave the following results:

ELEMENTAL ANALYSIS, WEIGHT PERCENT

| Element | Calculated | Found |
|---|---|---|
| Carbon | 24.5 | 23.7 |
| Hydrogen | 3.4 | 3.3 |
| Nitrogen | 28.6 | 25.9 |
| Sulfur | 21.8 | 21.8 |

The crosslinking and foaming of polyethylene was carried out with the cyclohexane-1,4-di(sulfonylazide) prepared in this example.

In this run, 0.1 gram of cyclohexane-1,4-di(sulfonylazide) was mixed with 10 grams of powdered high density polyethylene prepared by chromium oxide-catalyzed polymerization. The materials were mixed thoroughly in a test tube at 35 mm. absolute pressure, and the mixture was then heated in an oil bath slowly from 150° C. to 175° C. and held at 175° C. for about one-half hour. The test tube was then broken away, and about one-half of the sample was subjected to melt index determination. At the same time, a sample of the original powdered polyethylene was also submitted for melt index testing (ASTM D-1238–52T). The melt index of the untreated polyethylene was 5.30 under standard melt index conditions (2160 grams, 119° C.). The material which had been reacted with the azide had a melt index of 0.23 under high load conditions (119° C. and 46.35 pounds load). Samples of the unreacted polyethylene and polyethylene which had been reacted with the azide were also subjected to measurement of inherent viscosity.[1] The untreated polyethylene sample had an inherent viscosity of 1.16 in tetralin at 150° C., while the material which had been reacted with the azide was insoluble in tetralin at these conditions. The run was repeated using 10 percent by weight of the azide, and the polymer darkened markedly to a dark brown. It was again run using 2 percent by weight of the azide. A slight darkening around the upper edge of the polymer occurred but the foamed polymer obtained was nearly white.

*Example II*

Still another run was made in which foamed and crosslinked ethylenepropylene rubber (EPR [2]) was prepared by contacting EPR with the cyclohexane-1,4-di(sulfonylazide) prepared as described in Example I.

---

[1] By the method of Kemp et al., Industrial and Engineering Chemistry, 35, 1108 (1943).
[2] EPR:
    Wt. percent ethylene in polymer=43
    Mooney viscosity (ML–8 @ 212° F.)=40 (ASTM D–927–49T)
    Sp. gr. gm./cc.=0.86
    Crystallinity, percent=0
    Ash, wt. percent=0.2
    Volatiles, wt. percent=0.3

In this run, 1.0 gram of cyclohexane-1,4-di(sulfonylazide) was milled into 100 grams of EPR on a rubber mill at 195° F. There was no distinct evidence of any decomposition of the azide under these conditions, but the rubber seemed to become somewhat tougher during the operation. No bubbles were evident in the milled batch. Samples of the milled rubber were placed in a mold and heated to 190° C. for 10 minutes. A foamed rubber was produced. The bond between the separate layers of milled rubber added to build up the desired thickness was quite apparent, and a complete flow was not obtained. A small sample of the milled rubber was simply pressed between two plates at about 200° C. and 15,000 p.s.i. for about 15 minutes. This material was then removed and dumped in cold water. This sample had good elongation and elasticity and good snap. The material showed only about 10-15 percent permanent set when stretched 500 percent. At 870 percent elongation, the tensile strength of this rubber was 540 p.s.i. A similar sample made from unmilled EPR with no azide added showed permanent set when stretched only 50 percent beyond original length and had considerably less snap. The untreated EPR had an inherent viscosity of 2.41 in tetralin at 130° C. The EPR which was milled with only 1 percent of the azide had an inherent viscosity of 2.18 in tetralin at 130° C. The foamed EPR from the mold was insoluble in tetralin at 130° C., and the sample which was pressed and heated was also insoluble under these same conditions.

*Example III*

In another run, polypropylene was crosslinked and formed with the cyclohexane-1,4-di(sulfonylazide) prepared in Example I. In this run, 1 gram of cyclohexane-1,4-di(sulfonylazide) was added to 50 grams of polypropylene (powdered). This mixture was put in a 1-quart wide mouth jar along with a number of glass marbles and rotated on a ball mill rotator to obtain a good dispersion of the azide in the powdered polypropylene. Heating of the mixture to 200° C. for about 15 minutes produced a foamed polypropylene. The uncrosslinked polypropylene had an inherent viscosity of 2.42 in decalin at 135° C., while polymer treated with 2 percent of the above diazide was insoluble in decalin at 135° C. Polymer treated with 2 percent of the above azide at 200° C. for 15 minutes was pressed into a sheet at 5000 p.s.i. and 200° C. This sheet was insoluble in decalin at 135° C. Polymer treated with 1 percent of the above diazide and pressed into a sheet at 5000 p.s.i. and 200° C. was insoluble in decalin at 135° C. Material treated with 1 percent diazide and foamed was insoluble in decalin at 135° C.

*Example IV*

A run was carried out in which cyclopentane-1,3-di(sulfonylazide) was prepared and employed as a crosslinking agent for cis-1,4-polybutadiene. In this run, 67 grams of cyclopentane-1,3-di(sulfonyl chloride) and 400 ml. of denatured ethyl alcohol were combined and warmed to 50° C. At this time a solution of 50 grams of sodium azide in 100 ml. water was added. The temperature rose to about 65° C. and was held at 60-65° C. for 7 hours with continued stirring. The mixture was then partially stripped on a rotating film evaporator, after which 500 ml. of ether and 50 ml. of water were added. The ether separated after thorough mixing. The aqueous layer was extracted again with ether and the ether layers were combined. The combined ether layers were then dried over anhydrous magnesium sulfate, filtered and stripped on a rotating film evaporator. A white crystalline mass deposited, amounting to 65 grams, representing a 93 percent yield of crude cyclopentane-1,3-di(sulfonylazide). This material appeared somewhat hydroscopic and melted at 39-43° C. and decomposed at 115° C. This material burned rapidly but showed no sensitivity to a hammer blow.

An elemental analysis of the product gave the following results:

ELEMENTAL ANALYSIS, WEIGHT PERCENT

| Element | Calculated | Found |
|---|---|---|
| Carbon | 21.4 | 21.2 |
| Hydrogen | 2.9 | 3.0 |
| Nitrogen | 30.0 | 28.6 |
| Sulfur | 22.9 | 23.0 |

One percent by weight of the cyclopentane-1,3-di(sulfonylazide) prepared above caused rapid crosslinking of cis-1,4-polybutadiene during hot mastication at 120° C.

*Example V*

Treatment of polypropylene with 0.05 weight percent of cyclohexane-1,4-di(sulfonylazide) followed by heating to 200° C. caused the following changes in physical properties of polypropylene. The properties of the treated and untreated polypropylene are shown below in the form of a table.

| | Control | With Azide |
|---|---|---|
| Melt Index, @ 230° C | 1.3 | 0.43 |
| Density, g./cc. | 0.9027 | 0.9045 |
| Hardness, Shore D | 74 | 77 |
| Tensile, p.s.i., Comp | 4690 | 5730 |
| Elongation, percent | 207 | 21 |
| Flex. Mod. p.s.i.$\times 10^{-3}$ | 176 | 265 |
| Izod impact, notches, room temp. (+lbs./in. notch at room temp. 25° C.) | 0.93 | 1.8 |

While certain examples, structures, composition and process steps have been described for purposes of illustration, the invention is not limited to these. Variation and modification within the scope of the disclosure and the claims can be readily affected by those skilled in the art.

We claim:

1. An olefin polymer formed from at least one material selected from the group consisting of a homopolymer of ethylene and a homopolymer of propylene cured and foamed with a cycloalkane-di(sulfonylazide) of the formula

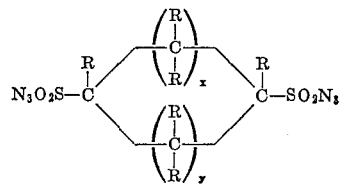

wherein $x$ is a positive integer ranging from 2 to 9, inclusive, $y$ is a positive integer ranging from 0 to 9, inclusive, and the sum of $x$ and $y$ ranges from 3 to 10, inclusive; wherein each R is selected from the group consisting of hydrogen and 1 to 3 carbon alkyl radicals, and wherein the total number of carbon atoms in the molecule does not exceed 20.

2. A homopolymer of ethylene cured and foamed with cyclohexane-1,4-di(sulfonylazide).

3. A foamed and cured homopolymer of ethylene prepared by the addition of cyclohexane-1,4-di(sulfonylazide) to polyethylene and heating the resultant admixture to a temperature above the decomposition temperature of the cyclohexane-1,4-di(sulfonylazide).

4. A homopolymer of propylene cured and foamed with cyclohexane-1,4-di(sulfonylazide).

5. A foamed and cured homopolymer of propylene prepared by the addition of cyclohexane-1,4-di(sulfonylazide) to polypropylene and heating the resultant admixture to above the decomposition temperature of the cyclohexane-1,4-di(sulfonylazide).

6. A method for curing and foaming a homopolymer of ethylene comprising incorporating in said polymer from 0.25 to 15 weight percent based on polymer of cyclohexane-1,4-di(sulfonylazide) and heating the resulting admixture to a temperature in the range of 100 to 250° C. for a period of time sufficient to cure said polymer.

7. A method for curing and foaming a homopolymer of propylene comprising incorporating in said polymer from 0.25 to 15 weight percent based on polymer of cyclohexane-1,4-di(sulfonylazide) and heating the resulting admixture to a temperature in the range of 100 to 250° C. for a period of time sufficient to cure said polymer.

8. A method for producing a foamed and cured polymer formed from at least one polymer selected from the group consisting of a homopolymer of ethylene and a homopolymer of propylene comprising incorporating an effective amount of at least one cycloalkane-di(sulfonylazide) having the formula recited in claim 1 into said polymer, and heating the resultant mixture to a temperature above the decomposition temperature of the cycloalkane-di(suflonylazide).

References Cited by the Examiner
UNITED STATES PATENTS

| | | | |
|---|---|---|---|
| 2,518,249 | 8/1950 | Ott | 260—2.5 |
| 2,532,243 | 11/1950 | Ott | 260—2.5 |
| 2,830,029 | 4/1958 | Adams | 260—2.5 |
| 2,927,904 | 3/1960 | Cooper | 260—2.5 |
| 3,058,944 | 10/1962 | Breslow et al. | 260—2.5 |
| 3,137,745 | 6/1964 | Johnstone | 260—2.5 |

MURRAY TILLMAN, *Primary Examiner.*

SAMUEL H. BLECH, *Examiner.*

M. FOELAK, *Assistant Examiner.*